(12) United States Patent
Wei et al.

(10) Patent No.: US 12,126,450 B2
(45) Date of Patent: Oct. 22, 2024

(54) WIRELESS DATA TRANSMISSION SYSTEM AND METHOD

(71) Applicant: Shanghai WUQI Microelectronics Co., Ltd., Shanghai (CN)

(72) Inventors: Ren Wei, Shanghai (CN); Da Liu, Shanghai (CN); Zhiyong Xu, Shanghai (CN)

(73) Assignee: SHANGHAI WUQI MICROELECTRONICS CO., LTD., Shanghai (CN)

( * ) Notice: Subject to any disclaimer, the term of this patent is extended or adjusted under 35 U.S.C. 154(b) by 385 days.

(21) Appl. No.: 17/645,474

(22) Filed: Dec. 22, 2021

(65) Prior Publication Data

US 2023/0136487 A1 May 4, 2023

(30) Foreign Application Priority Data

Oct. 29, 2021 (CN) .......................... 202111272738.X

(51) Int. Cl.
*H04L 1/1809* (2023.01)
*H04B 17/318* (2015.01)
*H04L 5/00* (2006.01)
*H04L 27/26* (2006.01)

(52) U.S. Cl.
CPC ......... *H04L 1/1809* (2013.01); *H04B 17/318* (2015.01); *H04L 5/0055* (2013.01); *H04L 27/2662* (2013.01)

(58) Field of Classification Search
CPC .......... H04W 52/0209; H04W 52/0225; Y02D 30/70; H04L 1/1809; H04L 5/0055; H04L 27/2662; H04L 69/16; H04B 17/318
See application file for complete search history.

(56) References Cited

U.S. PATENT DOCUMENTS

| 2016/0165623 | A1* | 6/2016 | Pan ....................... H04W 72/54 370/336 |
| 2020/0112395 | A1* | 4/2020 | Carsello .................. H04L 69/22 |
| 2020/0177348 | A1* | 6/2020 | Agarwal ............... H04L 1/1854 |
| 2020/0220655 | A1* | 7/2020 | Agarwal ................. H04L 43/12 |
| 2021/0251000 | A1* | 8/2021 | Sun .................... H04W 74/0808 |
| 2022/0053310 | A1* | 2/2022 | Cheong ................ H04L 1/1812 |
| 2022/0264646 | A1* | 8/2022 | Wang .................. H04W 74/002 |
| 2022/0295568 | A1* | 9/2022 | Hwang ............. H04W 74/0833 |

* cited by examiner

*Primary Examiner* — Omer S Mian

(74) *Attorney, Agent, or Firm* — HAUPTMAN HAM, LLP

(57) ABSTRACT

A wireless data transmission method includes sending by an external device a data packet; receiving by a primary device and a secondary device the data packet sent by the external device. When the secondary device does not receive the data packet sent by the external device correctly, sending by the secondary device a feedback signal to the primary device. When the secondary device receives the data packet sent by the external device correctly, not sending the feedback signal. The method further includes detecting by the primary device if the secondary device has sent the feedback signal. When the primary device receives the data packet successfully and detects that the secondary device has not sent the feedback signal, sending by the primary device an ACK signal to the external device; otherwise, sending by the primary device a NACK signal to the external device.

20 Claims, 2 Drawing Sheets

WIRELESS DATA TRANSMISSION SYSTEM AND METHOD

RELATED APPLICATIONS

The present application claims priority from Chinese Application Number 202111272738.X, filed Oct. 29, 2021, the disclosure of which is hereby incorporated by reference herein in its entirety.

TECHNICAL FIELD

The present invention relates to the field of communication technologies, and more particularly to a wireless data transmission system and method.

BACKGROUND

The birth of wireless technology has promoted the improvement of many products, e.g., the wireless transmission technology has brought headphones from the era of traditional wired headphones into the era of wireless headphones. In a word, the birth of wireless technology has brought much convenience to people's lives. Wireless transmission refers to a way of data transmission using the wireless technology. The implementation of wireless transmission involves the concept of slot which is exclusively used for a part of serial self-multiplexing of slot information of a certain single channel. In T1 and E1 services, a slot usually refers to a channel of 64 kbps. In the process of wireless transmission between two devices, the two devices usually undertake the transmitting and receiving work alternately in an interval slot to finish data exchange.

A wireless transmission system generally includes a primary device, a secondary device and an external device. When the wireless transmission system works, the external device and the primary device usually communicate wirelessly to alternately undertake the transmitting and receiving work at an interval slot. Specifically, the external device transmits a source file, which needs to be transmitted to the primary device and the secondary device, to the primary device at a first slot, and the primary device sends an ACK/NACK response to the external device at a second slot according to whether the source file sent by the external device is received correctly, so as to inform the external device whether the primary device has successfully and correctly received the source file sent by the external device. In this process, the primary device will send data required for monitoring, such as Bluetooth keys and device addresses, to the secondary device, such that the secondary device can monitor the external device which is sending the source file, and thus the secondary device and the primary device can receive the source file synchronously.

However, since the secondary device receives the source file sent by the external device by means of monitoring, it is impossible to inform, by means of sending a response to the external device, the external device whether the secondary device has successfully received the source file sent by the secondary device, which leads to that the external device is not aware of the failure to receive the source file by the secondary device. In order to solve this technical problem, it is proposed in the prior art that in the process of data transmission, the secondary device sends a feedback signal to the primary device while correctly receiving the source file, and then the primary device sends an ACK/NACK response to the external device according to its own file receiving condition and the feedback signal sent by the secondary device. However, in the above technical solution, the primary device and the secondary device need to frequently interact with each other, resulting in high energy consumption and shortened endurance time of the primary device and the secondary device.

SUMMARY

The present invention provides a wireless data transmission system and method, which can reduce energy consumption of a primary device and a secondary device during data transmission to increase the endurance time of the primary device and the secondary device.

A basic solution provided by the present invention is as below.

A wireless data transmission method includes the steps of:

S100: sending by an external device a data packet;

S200: receiving by a primary device and a secondary device the data packet sent by the external device;

S300: when the secondary device does not receive the data packet sent by the external device correctly, sending by the secondary device a feedback signal to the primary device; and when the secondary device receives the data packet sent by the external device correctly, not sending the feedback signal; and S400: detecting by the primary device if the secondary device has sent the feedback signal; when the primary device receives the data packet successfully and detects that the secondary device has not sent the feedback signal, sending by the primary device an ACK signal to the external device; otherwise, sending by the primary device a NACK signal to the external device.

The principle and advantages of the present invention are as below.

In this solution, owing to the interaction between the primary device and the secondary device, the primary device can know a data packet receiving condition of the secondary device, and then send the ACK/NACK signal to the external device according to a data packet receiving condition of the primary device itself and the data packet receiving condition of the secondary device, such that the external device can determine whether to re-send the data packet according to the receiving conditions of both of the primary device and the secondary device. In addition, a conventional transmission process of the data packet will not take up the whole slot, so the primary device and the secondary device have idle time to finish their interaction, without adversely affecting normal wireless transmission between the primary device and the external device. Therefore, with this solution, the data packet receiving conditions of the primary device and the secondary device can be drawn into full consideration on the premise of not adversely affecting the normal wireless transmission between the primary device and the external device, and a response can be sent to the external device accordingly.

Under normal working conditions, it is rare that a wireless device does not receive the data packet from the external device correctly. Therefore, in this solution, the secondary device sends the feedback signal to the primary device only when the secondary device does not receive the data packet sent by the external device correctly. Compared with the fact that the secondary device sends the feedback signal no matter whether the data packet is received correctly or not, or the fact that the secondary device sends the feedback signal in response to correct reception, the solution achieves a lower probability of sending the feedback signal, which makes the solution have the beneficial effect of saving electricity. In addition, since the secondary device has a lower probability of sending the feedback signal, i.e., a lower probability of taking up idle time for the interaction between the primary device and the secondary device, the influence of no idle time for the primary device and the secondary device to finish their interaction will be smaller, which makes the normal interaction between the primary device and the secondary device easier.

In summary, with this solution, the data packet receiving conditions of the primary device and the secondary device can be drawn into full consideration on the premise of not adversely affecting normal wireless transmission between the primary device and the external device, and a response can be sent to the external device accordingly; the energy consumption of the primary device and the secondary device in the data transmission process can also be reduced to prolong the endurance time of the primary device and the secondary device; and the normal interaction between the primary device and the secondary device is made easier.

Further, the feedback signal is radio frequency energy; and in S400, the primary device judges if the secondary device has sent the feedback signal by detecting if the radio frequency energy is greater than an energy threshold.

This solution has the following beneficial effect: as there is a probability that the primary device does not successfully receive the feedback signal from the secondary device, in this solution, the primary device sends a NACK signal to the external device so long as it receives radio frequency energy (the radio frequency energy may be emitted by devices other than the secondary device). This reduces the case that the secondary device does not correctly receive the data packet and the external device cannot know this condition due to abnormal interaction between the primary device and the secondary device. Further, when the radio frequency energy in an application environment of wireless devices is relatively high, the probability that a wireless device cannot correctly receive a data packet sent by an external device will be higher, so the added setting in this solution that the external device re-sends the data packet is more reasonable.

Further, the feedback signal is an AC packet; and in S400, the primary device receives the AC packet and judges if the secondary device has sent the feedback signal based on content of the AC packet.

This solution has the following beneficial effect: the primary device can know the data packet receiving condition of the secondary device by judging, after receiving the AC packet, if the secondary device has sent the feedback signal.

Further, the AC packet includes a sync word; in S300, sending the feedback signal includes:

generating a sync word based on a device address of the primary device, generating the AC packet based on the sync word, and sending the AC packet.

In S400, the primary device judges if the secondary device has sent the feedback signal by detecting if the sync word in the AC packet is identical with the sync word generated based on the device address of the primary device.

This solution has the following beneficial effect: the synchronizing word derived from the device address of the primary device makes the AC packet be received by the primary device more easily. The principle lies in that, in general, a 64-bit of the AC packet is generated by a low 24-bit of a Bluetooth address, i.e., lower address portion (LAP). For any different Bluetooth low 24-bit (LAP), an AC encoding method adopts a (64, 30) expurgated block code, ensuring that a minimum Hamming distance is greater than or equal to 14. This will improve the correlation ability of a receiver (i.e., the primary device and the secondary device in the present application) and ensure reliable reception. In practice, LAP from the receiver may also be used, but a fixed preset address LAP may not be used. This is because there may be multiple pairs of TWS devices in the same network environment, and conflicts may be generated between them in response to using the fixed address. In addition, in the specific implementation, the 64-bit may be increased to even 128-bit or higher to ensure a larger Hamming distance, which depends on remaining time between SLOT N and SLOT N+1.

Further, both the primary device and the secondary device are Bluetooth devices, and the device address is a Bluetooth lower address portion (LAP).

This solution has the following beneficial effect: the Bluetooth LAP is used as the device address to help distinguish a AC packet generated accordingly. The principle lies in that a Bluetooth device has different low address bits, and a high address bit is an ID of a manufacturer. Since these bits are the same for devices from the same manufacturer, it is of little significance to use these bits as a distinction to generate the AC packet.

Further, the method further includes S500: when the external device receives the ACK signal, not re-transmit the data packet; and when the external device receives the NACK signal, re-transmit the data packet, wherein a maximum number of times to re-transmit the data packet is N.

This solution has the following beneficial effect: when the external device receives the NACK signal, it means that the primary device or the secondary device does not receive the data packet correctly, so the data packet should be re-sent at this time. However, in order to prevent the failure of receiving the data packet due to other reasons and hence avoid delaying normal transmission of subsequent data packets, in this solution, the number of times to re-send the data packet by the external device is limited, such that the external device can be prevented from repeatedly re-send the data packet that cannot be correctly received, and the transmission of the subsequent data packets may not be delayed.

Further, in S300, when sending the feedback signal, the secondary device sends the feedback signal in idle time of a slot after the external device finishes its sending.

This solution has the following beneficial effect: the secondary device sends the feedback signal in idle time of a slot at which the external device sends the data packet, which will not interfere with normal reception of the data packet by the primary device, and the probability that the primary device successfully receives the feedback signal in the idle time is higher. Therefore, this solution can avoid interfering with the correct reception of the data packet by the primary device and increase the probability that the primary device successfully receives the feedback signal.

Further, in S300, when the secondary device receives a packet preamble of the data packet wrongly, the secondary device continues to parse payload length fields in the data packet, and sends the feedback signal after finishing the parsing.

This solution has the following beneficial effect: in this solution, when receiving the packet preamble of the data packet wrongly, the secondary device will continue to parse the payload length fields in the data packet, instead of directly sending the feedback signal after receiving the packet preamble wrongly. The principle lies in that after the secondary device receives the packet preamble wrongly, the primary device may still be receiving the data packet from the external device; and if the secondary device sends the feedback signal at this time, correct reception of the data packet by the primary device may be adversely affected, and the primary device may fail to receive the feedback signal correctly as a result. Therefore, this solution can avoid interfering with correct reception of the data packet by the primary device and increase the probability that the primary device successfully receives the feedback signal.

Further, in S300, when the secondary device receives the packet preamble of the data packet wrongly, the secondary device detects radio frequency energy in a medium, and sends a feedback signal when the radio frequency energy is reduced.

This solution has the following beneficial effect: in this solution, when the secondary device receives the packet preamble of the data packet wrongly, the secondary device detects the energy in the medium. The principle lies in that since there is energy in the medium when the external device sends the data packet, although the secondary device receives the packet preamble of the data packet wrongly, whether the data packet has been sent or not can still be determined by detecting the energy in the medium. Therefore, in this solution, when the energy is reduced, the secondary device sends the feedback signal to the primary device, which can avoid that the primary device is still receiving the data packet from the external device when the secondary device sends the feedback signal. Thus, correct reception of the data packet by the primary device cannot be interfered and the probability that the primary device successfully receives the feedback signal can be increased.

A wireless data transmission system includes a primary device, a secondary device and an external device, wherein data transmission is performed by using the above wireless data transmission method.

DETAILED DESCRIPTION

Detailed description is provided below with reference to the embodiments.

Embodiment 1

Figure 1:
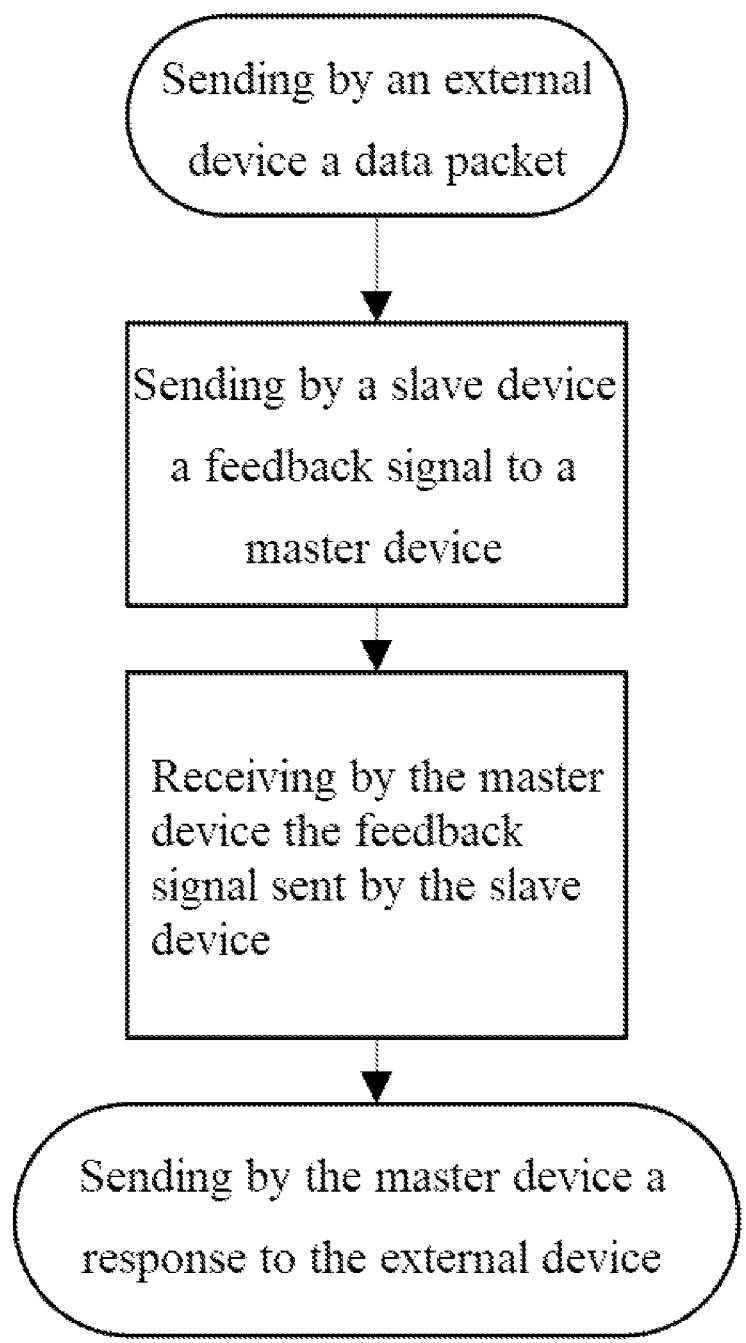
FIG. 1 is a flowchart block diagram of a wireless data transmission method according to an embodiment of the present invention.

Embodiment 1 is basically identical with the case shown in FIG. 1.

A wireless data transmission method is applicable to a primary device and a secondary device which can communicate with each other wirelessly, and the primary device can communicate with an external device wirelessly. As shown in FIG. 1, in this method, first, the external device sends a data packet at a first slot. After receiving the data packet, the secondary device interacts with the primary device during an idle time remaining in the first slot. Therefore, the primary device sends a response to the external device to instruct the external device to or not to re-send the data packet depending on if the primary device and the secondary device have received the data packet correctly.

The method specifically includes the following steps (the numbers for the respective steps in this solution are only intended to distinguish the steps, and are not intended to limit the execution order of the steps; and the steps may be executed concurrently).

In S100, the external device sends a data packet.

In S200, the primary device and the secondary device receive the data packet sent by the external device. In this embodiment, both the primary device and the secondary device are Bluetooth devices.

Figures 2, 3:
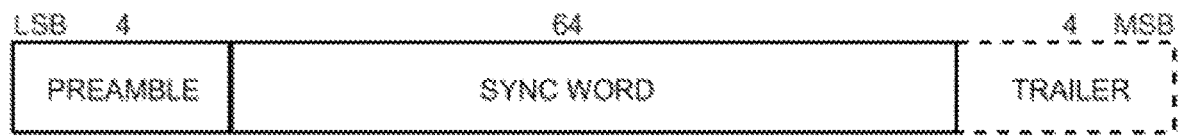
FIG. 2 is a schematic diagram illustrating data packet transmission in a wireless data transmission method according to an embodiment of the present invention.
FIG. 3 is a schematic diagram illustrating an AC packet in a wireless data transmission method according to an embodiment of the present invention.

In S300, when the secondary device does not receive the data packet sent by the external device correctly, the secondary device sends a feedback signal to the primary device; and when the secondary device receives the data packet sent by the external device correctly, the secondary device does not send the feedback signal. As shown in FIG. 3, in this embodiment, the feedback signal is an AC packet including a preamble, a sync word and a trailer. The secondary device generates the sync word based on a device address of the primary device, generates an AC packet based on the sync word, and sends the AC packet to the primary device. Specifically, the device address is a Bluetooth lower address portion LAP. In other embodiments of the present application, the feedback signal may also be radio frequency energy.

Specifically, in S300, when sending the feedback signal, the secondary device sends the feedback signal in idle time of a slot after the external device finishes its sending. When the secondary device receives a preamble of the data packet wrongly, the secondary device does not send the feedback signal to the primary device immediately. In this embodiment, when the secondary device receives the preamble of the data packet wrongly, the secondary device continues to parse payload length fields in the data packet, and sends the feedback signal to the primary device after finishing the parsing. In other embodiments of the present application, when the secondary device receives the preamble of the data packet wrongly, the secondary device receives radio frequency energy in a medium, and sends the feedback signal to the primary device when the radio frequency energy is reduced to an energy threshold. In addition, when the external device transmits data packets, due to the similarity in the types of the data packets, the secondary device can determine when the currently wrongly received data packets will be sent completely based on the types and lengths of previously received data packets. In other words, the secondary device determines the time for sending the feedback signal, and sends the feedback signal to the primary device based on the predicted sending time.

In S400, the primary device detects if the secondary device has sent the feedback signal; when the primary device receives the data packet successfully and detects that the secondary device has not sent the feedback signal, the primary device sends an ACK signal to the external device; otherwise, the primary device sends a NACK signal to the external device. In this embodiment, the primary device receives an AC packet, and judges if the secondary device has sent the feedback signal by detecting if a sync word in the AC packet is identical with the sync word generated based on the device address of the primary device.

In S500, when the external device receives the ACK signal, the data packet will not be re-transmitted; and when the external device receives the NACK signal, the data packet will be re-transmitted, wherein a maximum number of times to re-transmit the data packet is N, and specifically N=3. In other embodiments of the present application, when the primary device receives the radio frequency energy, and sends the NACK signal to the external device to instruct the external device to re-send the same data packet for M times, the primary device sends the ACK signal to the external device to instruct the external device not to re-send the data packet, wherein M=4.

In S600, when the primary device or the secondary device receives neither the data packet nor the data packet re-transmitted by the external device, the primary device or the secondary device performs Packet Loss Concealment.

As shown in FIG. 2, during data transmission, four cases 101, 102, 103 and 104 are classified based on whether the primary device and the secondary device have correctly received the data packet. In the table, SRC represents the external device, SNK-2 the secondary device, SNK-1 the primary device and SLOT a slot.

In the example 101, SRC sends a data packet TX which is successfully received by both SNK-1 and SNK-2. As SNK-2 may notify an "AC" packet to SNK-1, which indicates a failure of receiving "TX" SNK-1 reserves one receiving window for the "AC" during an idle time. As SNK-2 has successfully received the "TX", SNK-1 will not receive any data packet from SNK-2. Therefore, considering that SNK-2 has successfully received the "TX", SNK-1 sends one TX (ACK) to SRC.

In the example 102, after SRC sends the "TX", SNK-1 correctly receives the same, but SNK-2 does not correctly receive the same. After a reception failure, SNK-2 sends an "AC" packet to SNK-1. Knowing that SNK-2 has not correctly received the "TX", SNK-1 sends one TX (NACK) to SRC, despite that SNK-1 receives the "TX".

In the example 103, which is similar to the example 102, the only difference is that SNK-1 does not correctly receive the AC packet from SNK-2. As SNK-1 correctly receive the "TX" from SRC, SNK-1 sends one TX (ACK) to SRC. This means that SNK-2 has no chance to receive re-transmitted "TX" from SRC. To alleviate the influence of this case in which audio quality deterioration occurs to SNK-2 due to packet loss, some specific designs may be performed for the "AC" packet, so that the probability of receiving the AC by SNK-1 increases to be higher than the probability of receiving data packets of other types. For example, first, "AC" can only contain access codes, and can be specifically designed to increase the receiving probability of SNK-1. In addition, AC may not include any payload, but can be calculated from a LAP field of a MAC address of SNK-2. Through specific design and encoding, "AC" can be detected more easily than data packets of other types. In this way, the receiving probability of SNK-1 is increased. Secondly, "AC" may only be some radio frequency energy. Each time when SNK-1 detects any radio frequency energy during an idle time, regardless of noise of other devices or radio frequency energy from SNK-2, SNK-1 will regard the noise or the radio frequency energy as "AC" from SNK-2, and will send TX(NACK) to SRC.

In the example 104, after SRC sends the "TX", SNK-2 correctly receives it, and SNK-1 wrongly receives the same. In this case, SNK-1 sends TX(NACK) to request SRC for re-sending.

A wireless data transmission system is further disclosed. The system uses the above wireless data transmission method.

Embodiment 2

The basic principle of Embodiment 2 is the same as that of Embodiment 1. The difference of Embodiment 2 from Embodiment 1 lies in S400 of the wireless data transmission method in Embodiment 2, in which the primary device may further judge if the secondary device has sent the feedback signal by detecting if the radio frequency energy is greater than an energy threshold. As there is a probability that the primary device does not successfully receive the feedback signal sent by the secondary device, in this embodiment, the primary device sends a NACK signal to the external device so long as it receives radio frequency energy (the radio frequency energy may be emitted by devices other than the secondary device). This reduces the case that the secondary device does not correctly receive the data packet and the external device cannot know this condition due to abnormal interaction between the primary device and the secondary device. Further, when the radio frequency energy in an application environment of wireless devices is relatively high, the probability that a wireless device cannot correctly receive a data packet sent by an external device will be higher, so the added setting in this embodiment that the external device re-sends the data packet is more reasonable.

In Embodiment 2, a wireless data transmission system uses a corresponding wireless data transmission method.

The foregoing descriptions are merely embodiments of the present invention. General knowledge well known in the solution, such as specific structures and features, is not described in detail herein. Those of ordinary skill in the art know all ordinary technical knowledge in the field of the present invention prior to the filing date or priority date, can learn all prior arts in this field, and have an ability to apply conventional experimental methods prior to the said date. Under enlightenment of the present invention, those of ordinary skill in the art may complete and implement the solution with reference to their own abilities. Some typical well-known structures or methods should not be an obstacle for implementing the present invention by those of ordinary skill in the art. It should be noted that those of ordinary skill in the art may make several variants and improvements without departing from the structure of the present invention. These variants and improvements shall fall within the protection scope of the present invention, and cannot impact the implementation effect of the present invention and the practicability of the patent. The protection scope of the present invention shall be subject to the content of the claims. Detailed descriptions of the embodiments in the Description can be used to interpret the content of the claims.

What is claimed is:

1. A wireless data transmission method, comprising:
    sending, by an external device, a data packet;
    receiving, by a primary device and a secondary device, the data packet sent by the external device;
    determining whether the secondary device receives the data packet sent by the external device correctly;
    in response to determining the secondary device does not receive the data packet sent by the external device correctly, sending, by the secondary device, a feedback signal to the primary device;
    in response to determining the secondary device receives the data packet sent by the external device correctly, refraining from sending the feedback signal, wherein the refraining from sending the feedback signal comprises refraining from sending any signal corresponding to the secondary device correctly receiving the data packet sent by the external device;
    determining, by the primary device, whether the secondary device sent the feedback signal;
    in response to determining the primary device receives the data packet correctly and determining the secondary device refrained from sending the feedback signal, sending, by the primary device, an acknowledgement (ACK) signal to the external device; and in response to determining at least one of the primary device does not receive the data packet correctly or determining the secondary device sent the feedback signal, sending, by the primary device, a negative acknowledgement (NACK) signal to the external device.

2. The wireless data transmission method according to claim 1, wherein
the feedback signal is radio frequency energy; and
the primary device determines the secondary device sent the feedback signal in response to determining the radio frequency energy is greater than an energy threshold.

3. The wireless data transmission method according to claim 1, wherein
the feedback signal is an access control (AC) packet;
the primary device receives the AC packet; and
the primary device determines the secondary device sent the feedback signal based on content of the AC packet.

4. The wireless data transmission method according to claim 3, wherein
the AC packet comprises a first sync word;
the sending, by the secondary device, the feedback signal, comprises:
generating a second sync word based on a device address of the primary device,
generating the AC packet based on the first sync word, and
sending the AC packet; and
the primary determines the secondary device sent the feedback signal in response to determining the first sync word in the AC packet is identical with the second sync word generated based on the device address of the primary device.

5. The wireless data transmission method according to claim 4, wherein both the primary device and the secondary device are Bluetooth devices, and the device address is a Bluetooth Lower Address Portion (LAP).

6. The wireless data transmission method according to claim 1, further comprising:
in response to the external device receiving the ACK signal, refraining from re-transmitting the data packet; and
in response to the external device receiving the NACK signal, re-transmitting the data packet, wherein a maximum number of times to re-transmit the data packet is N, and N is an integer greater than or equal to 1.

7. The wireless data transmission method according to claim 1, wherein the secondary device sends the feedback signal in idle time of a slot after the external device finishes sending the data packet.

8. The wireless data transmission method according to claim 1, wherein the secondary device parses payload length fields in the data packet, the secondary device determines the secondary device did not receive the data packet sent by the external device correctly based on a packet preamble of the data packet being received incorrectly, and
in response to determining the secondary device receives the packet preamble of the data packet incorrectly, the secondary device continues to parse the payload length fields in the data packet, and sends the feedback signal after finishing parsing the payload length fields in the data packet.

9. The wireless data transmission method according to claim 1, wherein
the secondary determines the secondary device did not receive the data packet sent by the external device correctly based on a packet preamble of the data packet being received incorrectly,
in response to determining the secondary device receives the packet preamble of the data packet incorrectly, the secondary device detects radio frequency energy in a medium,
in response to determining the radio frequency energy is greater than a threshold value, the secondary device refrains from sending the feedback signal and continues to detect the radio frequency energy in the medium until the radio frequency energy is reduced to a value less than or equal to the threshold value, and
in response to determining the radio frequency energy is less than or equal to the threshold value, the secondary device sends the feedback signal.

10. A wireless data transmission system, comprising a primary device, a secondary device and an external device, wherein data transmission is performed by using the wireless data transmission method according to claim 1.

11. The wireless data transmission method according to claim 5, wherein the AC packet is encoded according to a (64, 30) expurgated block code to cause a Hamming distance of at least 14.

12. The wireless data transmission method according to claim 11, wherein the AC packet is 64-bit based on the (64, 30) expurgated block code, and the method further comprises:
determining an amount of time remaining between a first slot and a second slot after the first slot; and
increasing an AC packet size to a value greater than 64-bit based on the amount of time remaining between the first slot and the second slot.

13. The wireless data transmission method according to claim 12, wherein the AC packet size is increased up to 128-bit based on the amount of time remaining between the first slot and the second slot.

14. The wireless data transmission method according to claim 12, wherein the AC packet size is increased to a value greater than 128-bit based on the amount of time remaining between the first slot and the second slot.

15. The wireless data transmission method according to claim 12, wherein the AC packet is 64-bit based on the (64, 30) expurgated block code, the secondary device is a Bluetooth device, and the AC packet is generated by a 24-bit Bluetooth Lower Address Portion (LAP).

16. The wireless data transmission method according to claim 15, wherein the secondary device is a first Bluetooth device, and the primary device is a second Bluetooth device.

17. The wireless data transmission method according to claim 3, wherein the AC packet comprises access codes and is free from including data other than the access codes.

18. The wireless data transmission method according to claim 3, wherein the AC packet is free from including any payload, and the AC packet is calculated by the primary device based on a Lower Address Portion (LAP) of a media access control (MAC) address of the secondary device.

19. The wireless data transmission method according to claim 3, wherein the AC packet comprises radio frequency energy and is free from including any payload.

20. The wireless data transmission method according to claim 3, wherein the AC packet is initially 64-bit and is encoded to cause a Hamming distance of at least 14, and the method further comprises:
determining an amount of time remaining between a first slot and a second slot after the first slot; and increasing an AC packet size to a value greater than 64-bit based on the amount of time remaining between the first slot and the second slot to cause the Hamming distance to increase from 14 to a value greater than 14 corresponding to the increase in the AC packet size.

* * * * *